United States Patent [19]

Engel et al.

[11] Patent Number: 4,640,095
[45] Date of Patent: Feb. 3, 1987

[54] DIGITAL ELECTRO-HYDRAULIC VALVE ARRANGEMENT

[75] Inventors: William K. Engel, Peoria, Ill.; Stephen R. Bogert, Kennewick, Wash.

[73] Assignee: Caterpillar Inc., Peoria, Ill.

[21] Appl. No.: 695,512

[22] Filed: Jan. 28, 1985

[51] Int. Cl.[4] .............................................. F16D 33/02
[52] U.S. Cl. ....................................... 60/443; 91/444; 91/450; 137/613; 137/596.17
[58] Field of Search ................. 137/596.1, 596.17, 613; 60/443; 91/444, 448, 450, 452; 222/504, 545

[56] References Cited

U.S. PATENT DOCUMENTS

| 2,183,338 | 12/1939 | Slough | 73/864.34 |
| 3,754,565 | 8/1973 | Gennetten | 137/384.4 |
| 3,851,635 | 12/1974 | Murtin et al. | 123/139 E |

FOREIGN PATENT DOCUMENTS

| 56-9808 | 1/1981 | Japan |  |
| 56-153102 | 11/1981 | Japan | 91/448 |
| 2022715A | 12/1979 | United Kingdom | 91/444 |
| 808714 | 3/1981 | U.S.S.R. | 91/444 |
| 840518 | 6/1981 | U.S.S.R. | 91/444 |

Primary Examiner—Samuel Scott
Assistant Examiner—Allen J. Flanigan
Attorney, Agent, or Firm—John W. Grant

[57] ABSTRACT

Electro-hydraulic valve arrangements are useful in controlling a displacement control member of a variable displacement pump or motor. However, previous digital electro-hydraulic valves having brief pulse widths required special high speed solenoids to speed up the response time of the valve and resulted in increased cost of the valve. The subject digital electro-hydraulic valve arrangement includes a pair of on/off solenoid actuated valves arranged in series so that a flow path is initiated by a first of the valves and is disrupted by the second valve. The response times of the valves are equal such that directing an electrical signal to the second valve during the response time of the first valve results in extremely brief pulse widths of the valve arrangement. Using two solenoid actuated valves in this manner permits the use of less costly solenoid valves to provide very brief pulse widths through the total valve arrangement.

7 Claims, 2 Drawing Figures

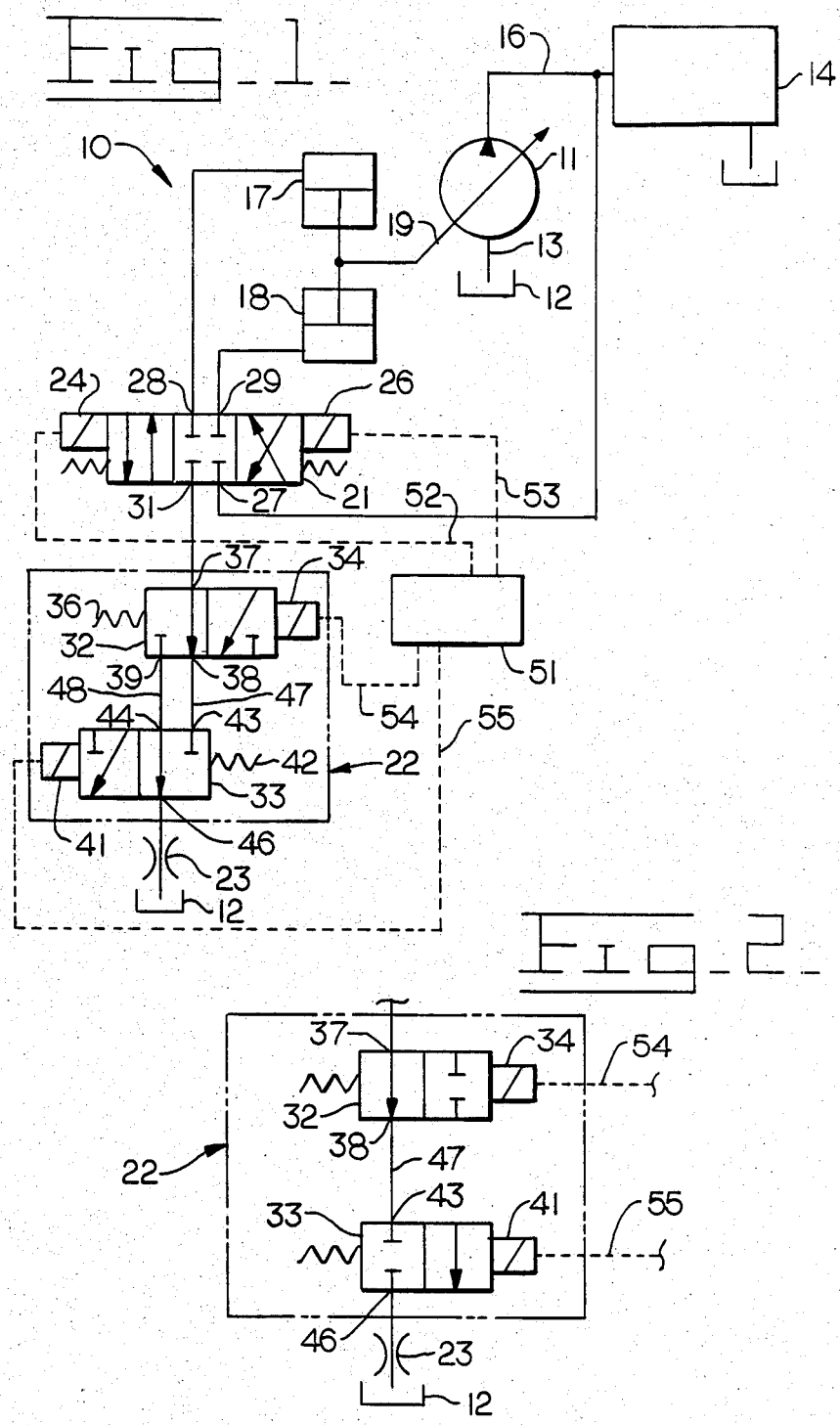

4,640,095

DIGITAL ELECTRO-HYDRAULIC VALVE ARRANGEMENT

TECHNICAL FIELD

This invention relates generally to hydraulic valves and more particularly to digital electro-hydraulic valve arrangements capable of providing pulses of fluid therethrough of very short duration.

BACKGROUND ART

During the past several years, microprocessors have been used more and more for controlling hydraulic valves for automating many hydraulic circuits. The microprocessor analyzes the data received from various pressure and/or flow sensors strategically placed within the circuit and directs a command signal to actuate the proper control valve. One of the problems encountered is that the microprocessor is normally digital and deals in discrete signals while the control valves heretofore have been analog in nature. Such valves are not readily compatible with digital electrical control signals and are prone to be sensitive to contamination.

In some electro-hydraulic systems the interface between the electronics and the hydraulics is a simple on/off solenoid valve in which a solenoid is connected to a spool of a hydraulic valve. Energizing the solenoid moves the valve spool to an on or open position in which fluid flow therethrough is established. Conversely, deenergizing the solenoid moves the valve to the off or closed position at which fluid therethrough is blocked. A problem encountered with such solenoid valves is that the response time (response time is considered the time lapse between the instant the electrical signal either reaches or is cut off from the solenoid and the instant the valve reaches either the on or off position) thereof is not fast enough for fine control of some actuators. For example, the minimum time that the valve spool is in the open position (pulse width) is dependent upon the time required for the magnetism in the coil of the solenoid to decay once the electrical signal is cut off. Thus, even if the electrical signal to the solenoid is cut off at precisely the same instant the valve reaches the open position, the solenoid valves commonly require a time greater than 30 milliseconds before the valve starts to move toward the closed position. While special high speed solenoids are available, the cost thereof would be prohibitive for most applications.

DISCLOSURE OF THE INVENTION

In one aspect of the invention, a digital electro-hydraulic valve arrangement comprises first and second solenoid actuated valves each having an inlet port and an outlet port. Each solenoid valve is movable between a first position at which the inlet port is in communication with the outlet port and a second position at which the inlet port is blocked from the outlet port. One of the valves includes means for biasing that valve to the first position and has a predetermined response time for moving from the first position to the second position. The other valve includes means for biasing that valve to the second position and has a response time for moving from the second position to the first position substantially equal to the predetermined response time of the one valve. The outlet port of the first valve is connected to the inlet port of the second valve so that a flow path is established between the inlet port of the first valve and the outlet port of the second valve in response to the other valve being moved to the first position. The flow path is disrupted when the one valve is moved to the second position.

The present invention provides a digital electro-hydraulic valve arrangement which is directly controlled by digital electrical signals and which is capable of providing pulses of fluid therethrough of very brief duration. The arrangement uses two solenoid actuated valves connected in series to control the fluid flow through a flow path selectively established through the two valves. Fluid flow through the flow path is initiated by one solenoid valve and is stopped by the other solenoid valve with the pulse width considered to be the time in which fluid is flowing through the flow path. Since the response time of both solenoid valves is equal, the pulse width is essentially the difference in time between when the signal is directed to the first valve and when the signal is directed to the second valve.

BRIEF DESCRIPTION OF THE DRAWINGS

FIG. 1 is a schematic illustration of an embodiment of the present invention associated with a variable displacement pump; and FIG. 2 is a schematic illustration of another embodiment of a digital electro-hydraulic valve arrangement.

BEST MODE FOR CARRYING OUT THE INVENTION

Referring now to FIG. 1, a digital electro-hydraulic control system is generally indicated by the reference numeral 10 for controlling the displacement of a variable displacement machine 11. The variable displacement machine 11 in this embodiment is a variable displacement pump connected to a tank 12 through an intake conduit 13 and to a work system 14 through a discharge conduit 16. The pump includes a pair of actuators 17,18 connected to a displacement control member 19.

Alternatively, the variable displacement machine 11 can be a variable displacement motor in which case the discharge conduit 16 would then become a supply conduit connected to a source of pressurized fluid such as a pump (not shown).

The digital electro-hydraulic control system 10 includes a directional control valve 21, a digital electro-hydraulic valve arrangement 22 and an orifice 23 arranged in series flow relationship. The directional control valve 21 is solenoid actuated and includes a pair of solenoids 24,26 connected to opposite ends of the valve. The directional control valve has an inlet port 27 connected to the discharge conduit 16, a pair of motor ports 28,29 connected to the actuators 17,18 and a discharge port 31. The discharge conduit 16 functions as a source of fluid pressure for the control system 10.

The digital electro-hydraulic valve arrangement 22 includes first and second solenoid actuated valves 32,33 connected in series between the discharge port 31 of the directional control valve 21 and the orifice 23. The first valve 32 includes a solenoid 34 and a spring 36 connected to opposite ends thereof. The first valve has an inlet port 37 and a pair of outlet ports 38,39. The inlet port 37 is connected to the discharge port 31 of the directional control valve 21. The second valve 33 includes a solenoid 41 and a spring 42 connected to opposite ends thereof and has a pair of inlet ports 43,44 and an outlet port 46. The inlet ports 43,44 are connected to the outlet ports 38,39 respectively of the first valve 32. The outlet port 46 is connected to the orifice 23.

As hereinafter described, the inlet port 37 and the outlet port 38 of the first valve and the inlet port 43 and outlet port 46 of the second valve define a first flow path 47 through the digital electro-hydraulic valve arrangement 22 with the first and second valves in one position. The inlet port 37 and outlet port 39 of the first valve 32 and the inlet port 44 and outlet port 46 of the second valve 33 define a second flow path 48 through the digital electro-hydraulic valve arrangement 22 when the first and second valves are in another position. The first and second valves are preferably contained within a common housing or body (not shown).

The orifice 23 functions as a means for limiting the flow rate through the first and second flow paths 47,48 from the discharge port 31 of the valve 21 to the tank 12.

A microprocessor 51 is connected to the solenoids 24,26 of the directional control valve 21 through electrical leads 52,53 and to the solenoids 34 and 41 of the first and second valves 32,33 through electrical leads 54,55.

An alternate embodiment of a digital electro-hydraulic valve arrangement 22 of the present invention is disclosed in FIG. 2. It is noted that the same reference numerals of the first embodiment are used to designate similarly constructed counterpart elements of this embodiment. In this embodiment, however, the first valve 32 has a single outlet port 38 and the second valve 33 has a single inlet port 43. Thus, only a single flow path 47 is provided through the digital electro-hydraulic valve arrangement of this embodiment. Also the orifice 23 is positioned downstream of the inlet port 37 of the first valve 32 as part of the valve arrangement 22.

INDUSTRIAL APPLICABILITY

With reference to the first embodiment of FIG. 1, the directional control valve 21 is movable between a neutral position and first and second operative positions. At the first position as shown in the drawing, the inlet port 27, the motor ports 28 and 29 and the discharge port 31 are all isolated from one another. Shifting the valve to the right as viewed in the drawing places the inlet port 27 in communication with the motor port 29 and places the motor port 28 in communication with the discharge port 31. Shifting the valve 21 to the left places the inlet port 27 in communication with the motor port 28 and places the motor port 29 in communication with the discharge port 31.

Each of the first and second solenoid actuated valves 32,33 are movable between first and second positions. At the first position of the first valve, the inlet port 37 is in communication with the first outlet port 38 and is blocked from the second outlet port 39. At the second position of the first solenoid valve, the inlet port 37 is in communication with the second outlet 39 and blocked from communication with the first outlet port 38. The spring 36 functions as a means for biasing the first valve 32 to the first position as shown in the drawing.

The spring 42 functions as a means for biasing the second valve 33 to the second position as shown in the drawing. At the second position of the second valve, the second inlet port 44 is in communication with the outlet port 46 and the first inlet port 43 is blocked from the outlet port 46. At the first position of the second valve 33, the first inlet port 43 is in communication with the outlet port 46 while the second inlet port 44 is blocked from the outlet port 46. Thus, with both valves in the first position, the first fluid flow path 47 is established through the digital electro-hydraulic valve arrangement 22. When both valves are in the second position, the second flow path 48 is established through the digital electro-hydraulic valve arrangement. When one of the first and second valves is in the second position and the other valve is in the first position, both flow paths are disrupted.

The first valve 32 has a predetermined response time for moving from the first position to the second position when the solenoid is energized. The response time is considered the time lapse between the instant the electrical signal reaches the solenoid and the instant the valve reaches the open position. A large portion of the response time is the time required to build sufficient electro-motive force in the solenoid 34 to move the valve. The response time of the second valve 33 moving from the second position to the first position is substantially equal to the predetermined response time of the first valve. Further the response time of the first valve moving from the second position to the first position and the response time of the second valve moving from the first position to the second position is substantially equal.

In operation, the directional control valve 21 controls in which direction the displacement control member 19 is to be moved while the digital electro-hydraulic valve arrangement 22 and the orifice 23 controls the degree of movement of the displacement control member. For example, to move the displacement control member clockwise, an electrical signal is directed from the microprocessor 51 to energize the solenoid 24 thereby moving the directional control valve to the right to the first operative position. At this position, fluid from the discharge conduit 16 is directed to the actuator 18 while the fluid being discharged from the actuator 17 passes through the directional control valve to the inlet port 37 of the first valve 32. The microprocessor 51 also selectively directs an electrical signal to energize either the solenoid 34 of the first valve 32 or the solenoid 41 of the second valve 33. For example, energizing solenoid 41 moves the second valve to the first position. With both the first and second valves now at the first position, the flow path 47 is established so that the fluid discharged from the actuator 17 passes therethrough and through the orifice 23 to the tank. When the displacement control member 19 reaches the desired position, the microprocessor then directs an electrical signal to energize the solenoid 34 of the first valve 32 thereby shifting it to the second position disrupting the flow path thereby blocking the discharge of fluid from the actuator 17 and stopping the movement of the displacement control member 19. The signal to the solenoid 24 is then shut off and the control valve 28 is returned to the neutral position. The electrical signal referred to above is more correctly defined as a plurality of pulses which are so close together that the solenoids cannot react to the interruption effectively simulating one continuous pulse or signal. The "desired position" of the displacement control member 19 referred to above may be determined by comparing the actual position thereof with an input command signal to the microprocessor 51. The input command signal may be from a manual control element (not shown) or from a sensor which senses an operational parameter of the work system 14.

It can be readily seen that the degree of movement of the displacement control member 19 is directly controlled by the time duration at which both the first and second valves are in the first position. The time duration at which the first flow path 47 exists can be made very brief by directing the electrical signal to the solenoid 34 of the first valve during the response time of the second valve. Time durations of 400 microseconds have been achieved with solenoid valves having a 30 millisecond response time. This translates into controlled movement of the displacement control member 19 less than 0.5% of full travel.

When movement of the displacement control member 19 is again initiated by the microprocessor 51 within a preset time, the electrical signal to the solenoid 41 is cut off first to move the second valve 33 to the second position to initiate flow through the second flow path 48. At the proper time lapse, the electrical signal to the solenoid 34 of the first valve 32 is cut off to move the first valve to the first position to disrupt the fluid flow through the second flow path. If no movement is initiated within the preset time, the solenoids 34 and 41 are deenergized and the valves 32 and 33 return to their first and second positions respectively.

The operation of the embodiment of FIG. 2 is essentially similar to that of FIG. 1 in that the flow path 47 through the digital electro-hydraulic valve arrangement is initiated by first energizing the solenoid 41 for moving the second valve to the first position. The flow path is disrupted by directing an electrical signal to energize the solenoid 34 to move the first valve to the second position. However, to reestablish the flow path when the first valve is in the second position and the second valve is in the first position, the solenoid 34 must first be deenergized to move the first valve to the first position with the solenoid 41 of the second valve subsequently being deenergized to move the second valve to the second position for disrupting the flow path.

Alternatively, the microprocessor 51 may be programmed to reset the first and second valves 32,33 to their initial position shown in the drawings immediately after the flow path 47 is disrupted so that the cycle for initiating flow through the flow path is always started by energizing the solenoid 41 and is stopped by energizing the solenoid 34. The valves are reset by first deenergizing the solenoid 41 to move the second valve 33 to the second position. The solenoid 34 is then deenergized to move the first valve 32 to the first position.

In view of the foregoing, it is readily apparent that the structure of the present invention provides an improved digital electro-hydraulic control capable of providing very brief incremental movements of the displacement control member 19. This is achieved by arranging two solenoid actuated valves in series such that a flow path is established by movement of one of the valves and is disrupted by movement of the second valve. The response time of the valves is negated since the electrical signal to actuate the second valve can be directed thereto at any time during the response time of the first valve. Moreover, since both of the valves are simple on/off valves and do not modulate fluid flow therethrough, the valves are insensitive to fluid contamination.

Other aspects, objects and advantages can be obtained from the drawings, the disclosure and the appended claims.

We claim:

1. A digital electro-hydraulic control system for controlling the displacement of a variable displacement machine having a displacement control member and a pair of actuators operatively connected to the displacement control member comprising:
a source of pressurized fluid;
a tank;
a solenoid actuated directional control valve having an inlet port, a pair of motor ports and a discharge port, said inlet port being connected to said source of pressurized fluid and the motor ports being connected to the actuators of the variable displacement machine, said directional control valve being movable between a neutral position and an operative position at which the inlet port is in fluid communication with one of the motor ports and the other motor port is in communication with the discharge port;
a digital electro-hydraulic valve arrangement positioned between the discharge port of the directional control valve and the tank, said valve arrangement including first and second solenoid actuated valves each having an inlet port and an outlet port and being movable between a first position at which the inlet port is in communication with the outlet port and a second position at which the inlet port is blocked from the outlet port, one of said first and second valves including means for biasing said one valve to the first position and having a predetermined response time for moving from the first position to the second position, the other of said first and second valves including means for biasing said other valve to the second position and having a response time for moving from the second position to the first position substantially equal to the predetermined response time of the one valve, said outlet port of said first valve being connected to the inlet port of the second valve to establish a flow path between the inlet port of the first valve and the outlet port of the second valve in response to said other valve being moved from the second position to the first position, said flow path being disrupted when the one valve is moved from the first position to the second position.

2. The control system of claim 1 wherein the response time of said one valve moving from the second position to the first position is substantially equal to the response time of said other valve moving from the first position to the second position.

3. The control system of claim 2 wherein the one valve is said first valve.

4. The control system of claim 2 wherein the first valve has a second outlet port which is blocked from the inlet port of the first valve at the first position of the first valve and is in communication therewith at the second position of the first valve, and the second valve has a second inlet port which is blocked from the outlet port of the second valve at the first position of the second valve and is in communication therewith at the second position of the second valve, said second outlet port being connected to the second inlet port to establish a second fluid flow path between the inlet port of the first valve and the outlet port of the second valve when both the first and second valves are in their second position, said second flow path being disrupted when either one of said first and second valves is in its first position.

5. The control system of claim 1 including means for limiting fluid flow passing through the first flow path.

6. The control system of claim 5 wherein said means for limiting is an orifice positioned between the outlet port of the second valve and the tank.

7. The control system of claim 1 including means for directing a first electrical signal to the other valve and for directing a second electrical signal to the one valve during the response time of the other valve.

* * * * *